US009046602B2

(12) United States Patent
Gardner et al.

(10) Patent No.: US 9,046,602 B2
(45) Date of Patent: Jun. 2, 2015

(54) RANGE LOCALIZATION SYSTEM

(75) Inventors: Barry L. Gardner, Broomfield, CO (US); Richard W. Koralek, Belfast, MA (US)

(73) Assignee: EIDO, LLC, Broomfield, CO (US)

( * ) Notice: Subject to any disclaimer, the term of this patent is extended or adjusted under 35 U.S.C. 154(b) by 489 days.

(21) Appl. No.: 13/461,557

(22) Filed: May 1, 2012

(65) Prior Publication Data

US 2012/0280865 A1 Nov. 8, 2012

Related U.S. Application Data

(60) Provisional application No. 61/482,344, filed on May 4, 2011.

(51) Int. Cl.
G01S 3/02 (2006.01)
G01S 13/87 (2006.01)
G01S 5/02 (2010.01)
G01S 5/14 (2006.01)
G01S 7/40 (2006.01)
G01S 7/52 (2006.01)

(52) U.S. Cl.
CPC .............. *G01S 13/878* (2013.01); *G01S 5/021* (2013.01); *G01S 5/14* (2013.01); *G01S 2007/4091* (2013.01); *G01S 7/52004* (2013.01)

(58) Field of Classification Search
CPC .............. G01S 5/02; G01S 5/06; G01S 5/14
USPC ................. 342/457, 458, 463; 455/456.6, 457
See application file for complete search history.

(56) References Cited

U.S. PATENT DOCUMENTS

| 5,144,312 | A | 9/1992 | McCann |
| 6,300,904 | B1 | 10/2001 | Dvorak et al. |
| 6,710,719 | B1 | 3/2004 | Jones |
| 8,018,383 | B1 * | 9/2011 | Schantz et al. ............... 342/453 |
| 2003/0006935 | A1 | 1/2003 | Bay |

FOREIGN PATENT DOCUMENTS

GB 2298098 8/1996

OTHER PUBLICATIONS

Zhang, Cemin, et al; Real-Time Noncoherent UWB Positioning Radar With Millimeter Range Accuracy: Theory and Experiment; IEEE Transactions on Microwave Theory and Techniques; vol. 58, No. 1, Jan. 2010.
Stelzer, Andreas, et al; A Microwave Position Sensor with Submillimeter Accuracy; IEEE Transactions on Microwave Theory and Techniques; vol. 47, No. 12, Dec. 1999.
Qing, Xianming, et al; Characterization of RF Transmission in Human Body; Institute for Infocomm Research, Singapore; 2010.

(Continued)

*Primary Examiner* — Dao Phan
(74) *Attorney, Agent, or Firm* — Martensen IP

(57) ABSTRACT

The location of a transmitter can be determined by accurately measuring the elapsed time that it takes for a signal to propagate from a transmission source to a plurality of disparate receivers of a known location. By comparing the received transmitted signal to reference signal a range between each receiver and the transmitter can be determined. By intersecting the spheres defined by each range an accurate location of the transmitter can be obtained.

27 Claims, 6 Drawing Sheets

(56) References Cited

OTHER PUBLICATIONS

Ahmed, Yasir, et al; A 31.5 GHz Patch Antenna Design for Medical Implants; Hindawi Publishing Corp., International Journal of Antennas and Propagation; vol. 2008, Article ID 167980, 6 pages; 2008.

Chen, Hon-Zon T, et al; A Study of RF Power Attenuation in Bio-Tissues; Journal of Medical and Biological Engineering, 24(3): 141-146; Sep. 20, 2004.

Jones, Inke, et al; Wireless RF Communication in Biomedical Applications; Smart Materials and Structures; IOP Publishing; 17 (2008).

Wireless Medium Access Control (MAC) and Physical Layer (PHY) Specifications for Low-Rate Wireless Personal Area Networks (WPANs); Part 15.4; IEEE Computer Society; IEEE Std 802.15.4a-2007.

Hamici, Zoubir, et al; A High-Efficiency Power and Data Transmission System for Biomedical Implanted Electronic Devices; IOP Science; Meas. Sci. Technol 7 (1996) 192-201.

Merkl, Brandon Cole; The Future of the Operating Room: Surgical Preplanning and Navigation Using High Accuracy Ultra-Wideband Positioning and Advanced Bone Measurement; A Disseration Presented for the Doctor of Philosophy Degree; The University of Tennessee, Knoxville; Dec. 2008.

Real-Time In-Vivo Tracking Using RF Positioning Research Report; Syncroness, Inc.; 2011.

\* cited by examiner

RANGE LOCALIZATION SYSTEM

RELATED APPLICATION

The present application relates to and claims the benefit of priority to U.S. Provisional Patent Application No. 61/482,344 filed 4 May 2011, which is hereby incorporated by reference in its entirety for all purposes as if fully set forth herein.

BACKGROUND OF THE INVENTION

1. Field of the Invention

Embodiments of the present invention relate, in general, to range localization and more particularly to identifying the location of an object within three dimensional space by correlating a single transmission from multiple receivers.

2. Relevant Background

Accurately determining relative position is critical to successful implementation of a variety of technology. What technology is employed and how it is used often hinges on to what degree of accuracy the position of the relative components can be determined. The range of such a need is immense and varies from the need to position a read/write head over the correct track as it flies some $2/1,000,000$ of an inch above a magnetic disk as the disk revolves some 10,000 revolutions per minute, to enabling an aircraft to fly halfway around the world and land within inches of its intended destination without the aid of any visual references.

Accurate positional awareness has traditionally relied on a mechanical coupling between two or more components. Indeed that is how the computer storage read/write head can be positioned much closer to a magnetic disk (much closer than the thickness of a human hair) without fear of making contact to that disk. But such mechanical linkage presents numerous limitations. The most obvious of which is the inability to navigate from one location to another or to simply judge how far a certain object is.

In World War II a major breakthrough occurred with respect to position awareness. That invention was the use of radio waves to determine the distance to an object and the rate at which that object was moving. More commonly known as Rate and Distance and Range ("Radar") revolutionized many aspects of everyday life. Certainly the ability to position an aircraft or ship for military purposes was a distinct advantage but as the technology evolved, the same concept found its way into many aspects of everyday life. For example weather forecasting and speed traps find their roots in the Radar technology of World War II.

As technology continued to evolve, a new means of determining relative position was developed by understanding slight variations in how long it takes a radio signal to reach a receiver. Radio waves travel at substantially the speed of light. Therefore, strong enough signals from vastly different locations, will reach the same location at different times. When the time differences from three different transmitters from known locations are compared, a triangulation of sorts can be calculated and the position of its intersection can be determined. Unfortunately, the speed of light requires that the relative distances needed to appreciably measure temporal differences in the signal be very large. The Global Positioning Satellite ("GPS") system solves that challenge by placing several very large signal transmitters high in earth orbit.

The Global Positioning System (GPS) is a locational and navigational system that allows users to pinpoint a place with great accuracy. The current GPS system makes use of signals transmitted by some of the 24 dedicated satellites circling the globe in precisely defined orbits. Using the satellites as reference points, GPS receivers calculate their positions based on the difference in arrival time of signals from the different satellites. Although GPS was initially developed for the U.S. military to guide missiles to targets, it is now routinely used for air traffic control systems, ships, trucks and cars, mechanized farming, search and rescue, tracking environmental changes, and more.

As mentioned above, GPS is a space-based satellite navigation system that provides location and time information in all weather, anywhere on or near the Earth, where there is an unobstructed line of sight to four or more GPS satellites. The GPS program provides critical capabilities to military, civil and commercial users around the world and is the backbone for modernizing the global air traffic system.

The GPS project was developed in 1973 to overcome the limitations of previous navigation systems, integrating ideas from several predecessors, including a number of classified engineering design studies from the 1960s. To determine a location on the earth, a GPS receiver calculates its position by precisely timing the signals sent by GPS satellites high above the Earth. Each satellite continually transmits messages that include the time the message was transmitted and the satellite position at time of message transmission.

The receiver uses the messages it receives to determine the transit time of each message and computes the distance or range to each satellite. These distances along with the satellites' locations are used to compute the position of the receiver. A satellite's position and range define a sphere, centered on the satellite, with radius equal to the range. The position of the receiver is somewhere on the surface of this sphere. Thus with four satellites, the indicated position of the GPS receiver is at or near the intersection of the surfaces of four spheres. In the ideal case of no errors, the GPS receiver would be at a precise intersection of the four surfaces.

One of the most significant error sources is the GPS receiver's clock. Because of the very large value of the speed of light, c, the estimated distances from the GPS receiver to the satellites, the range, are very sensitive to errors in the GPS receiver clock; for example an error of one microsecond (0.000001 second) corresponds to an error of 300 meters (980 ft). This suggests that an extremely accurate and expensive clock is required for the GPS receiver to work; however, manufacturers prefer to build inexpensive GPS receivers for mass markets. This dilemma is resolved by taking advantage of the fact that there are four ranges.

It is likely that the surfaces of the three spheres intersect, because the circle of intersection of the first two spheres is normally quite large, and thus the third sphere surface is likely to intersect this large circle. If the clock is wrong, it is very unlikely that the surface of the sphere corresponding to the fourth satellite will initially intersect either of the two points of intersection of the first three, because any clock error could cause it to miss intersecting a point. On the other hand if a solution has been found such that all four sphere surfaces at least approximately intersect with a small deviation from a perfect intersection then it is quite likely that an accurate estimation of receiver position will have been found and that the clock is quite accurate.

The current GPS system is comprised of three segments; the space segment, the control segment and the user segment. The space segment (SS) is as one might imagine composed of the orbiting GPS satellites. The orbits are centered on the Earth, not rotating with the Earth, but instead fixed with respect to the distant stars. The orbits are arranged so that at least six satellites are always within line of sight from almost everywhere on Earth's surface. The result of this objective is that the four satellites are not evenly spaced (90 degrees) apart within each orbit. In general terms, the angular difference between satellites in each orbit is 30, 105, 120, and 105 degrees apart which, of course, sum to 360 degrees.

The control segment is composed of a master control station (MCS), an alternate master control station, four dedicated ground antennas and six dedicated monitor stations. The flight paths of the satellites are tracked by dedicated monitoring stations. Then the agency responsible for the satellites contacts each GPS satellite regularly with navigational updates using dedicated or shared ground antennas. These updates synchronize the atomic clocks on board the satellites to within a few nanoseconds of each other, and adjust the ephemeris of each satellite's internal orbital model.

The user segment is composed of hundreds of thousands of U.S. and allied military users of the secure GPS Precise Positioning Service, and tens of millions of civil, commercial and scientific users of the Standard Positioning Service. In general, GPS receivers are composed of an antenna, tuned to the frequencies transmitted by the satellites, receiver-processors, and a highly stable clock (often a crystal oscillator). They may also include a display for providing location and speed information to the user.

The vast distance between the GPS satellite transmitters and the receivers enables relatively simple processing to determine range differences and thus a location. The system depends on the knowledge of each satellites precise location and a precise time indication of when the signal was transmitted. A need exists to determine a precise location of an object without the limitations of the prior art. These and other deficiencies of the prior art are addressed by one or more embodiments of the present invention.

SUMMARY OF THE INVENTION

The location of a transmitter can be determined by accurately measuring the elapsed time from signal transmission to reception at a plurality of receivers of a known but disparate location. By comparing the received transmitted signal to a reference signal a delay due to the signal's traversal of a medium can be observed. Each calculated delay can be resolved into a sphere of ranges from each receiver to the transmitter. By intersecting the resulting spheres an accurate location of the transmitter can be obtained.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to one embodiment of the present invention a range localization system comprises a plurality of receivers, each of a known location, a transmitter, and a master station. The master station, which is in communication with the transmitter and each of the plurality of receivers, generates a reference signal and a transmission signal, each of which are conveyed to the receivers and transmitter respectively. The location of the transmitter can thereafter be determined by comparing the transmission signal received by each receiver to the reference signal.

Using a range determined from the comparison of the transmission signal received at each receiver to the reference signal a plurality of spheres can be defined. The intersection of these spheres identifies the location of the transmitter. In one embodiment an accurate location of the transmitter can be determined with as few as three receivers, as the time of the transmission and the location of the receivers are known, giving three points of reference and three unknowns for which to solve. According to one preferred embodiment the receivers and transmitter are hardwired coupled to the master station.

The signal transmitted from the transmitter and reference signal conveyed to each receiver, in one embodiment, can be a digital pulse sequence. In other embodiments the signals can be analog such as a plurality of sinusoidal signals or a modulated sequence of digital pulses.

Another aspect of the invention includes the presence of a datum and/or a reference point of a known location that can be used as a point of calibration and generation of error compensation values. Moreover a plurality of transmitters can simultaneously transmit unique reference signals to be compared against equally unique reference signals at each receiver to provide a volumetric representation of a locos of points.

A method for determining the location of an object is also disclosed. By generating at a master station a transmission signal and a reference signal a range between the transmitter and each receiver can be determined by comparing the received transmission signal to the reference signal. With a range to the transmitter known for each receiver the transmitter's location can be determined.

These and other features of the present invention are described in more detail by way of example below.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

DESCRIPTION OF THE INVENTION

Figure 1:
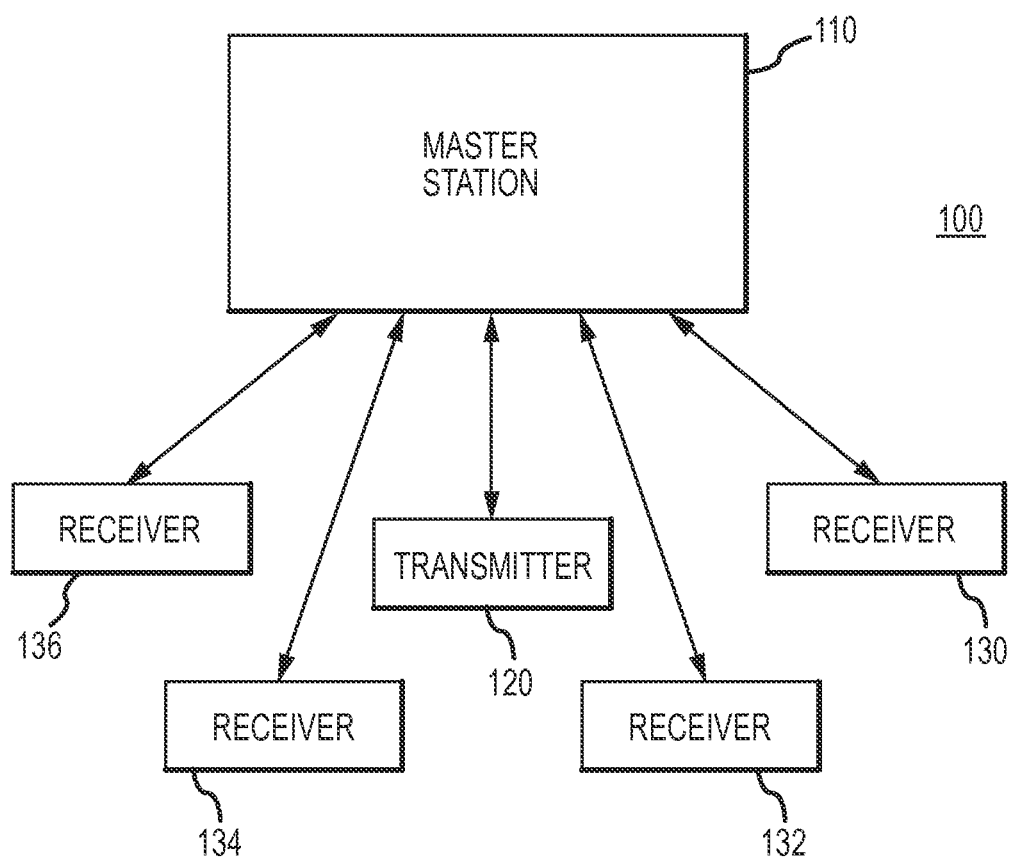
FIG. 1 shows a high level block diagram of a system for range localization according to one embodiment of the present invention.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted by those skilled in the art without departing from the spirit and scope of the invention. Descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to determine the location of an object using the range localization system of the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

A short range three-dimensional localization system based on electromagnetic signals can, according to one or more embodiments of the present invention, accurately determine the position of a device. According to one embodiment of the present invention, a transmitting antenna's location can be determined using a group of receiving stations of known location. FIG. 1 shows a high level block diagram of a system 100 for range localization. As shown, a master station 110 generates a transmit signal and one or more timing signals/reference signals for various modules, as well as performing the actual location computations based on inputs from the receivers 130, 132, 134, 136. The transmitter 120 and all the receivers 130, 132, 134, 136 are, in one embodiment of the present invention, connected by calibrated wires and share a common, accurate clock signal. By knowing the characteristics of the wires connecting the transmitter and receivers to the master station an understanding of any alterations of the transmission signal or reference signal can be recognized and taken into account. By comparing the received signal to the reference signal each receiver can determine its distance from the transmitter. Accordingly the three dimensional location of the transmitter can then be determined.

As is well known, a range from a single point in space defines a sphere with its origin resting at that point. As the location of each receiver is known, the range to the transmitter identified by each receiver defines a unique sphere. As the signal was transmitted from a single source the point at which all of the spheres intersect defines the location of the transmitter. However, given that radio waves travel at the speed of light, the ability to identify small differences in the time that the transmitted signal took to arrive at each receiver is problematic.

These challenges are addressed by one embodiment of the present invention by hard wire coupling the receivers and transmitter to a common master station. With the receivers and the transmitter wired to the same signal generator a very accurate understanding of what signal was transmitted can be obtained as can a very accurate reference signal by which to compare the received signal. In addition, the composition of the signal itself is modified to aid in arriving at the desired spatial resolution.

One aspect of the present invention is the use of extremely high frequencies to achieve the desired spatial resolution. For example, an electromagnetic pulse propagating in free space at the speed of light that is 1 centimeter long requires a pulse frequency of approximately 30 giga bits per second (Gbps). The high frequency limit found in digital circuitry is balanced with that of attenuation of such high frequencies through different materials such as the human body. The present invention considers several approaches including digital and analog signals as well a modulated sequential signal exhibiting characteristics of both digital and analog signals. Each approach has advantages and disadvantages, which will be discussed in some detail.

According to one embodiment of the present invention, the signal processing between the transmitter and the receivers is digital. Such a digital approach uses signal and processing concepts similar to the fundamentals behind GPS and radar systems but with significant advances in capability. According to one embodiment of the present invention, an elementary system generates and the transmitter transmits a short rectangular pulse. The frequency of the pulse generator or oscillator determines the width of the pulse. Each receiver receives the pulsed signal after it is transmitted. The received pulse is delayed a finite amount of time due to the distance it has traveled to arrive at the receiver. At the receiver(s), the received signal is matched with a prototype or reference pulse (also referred to herein as a reference signal) to determine the delay. The time at which the received pulse most closely lines up with the reference pulse represents the delay (in time) between the transmitter and receiver. This time delay can then be translated into a distance. Multiple distances from multiple receivers at fixed locations can be translated into a position of the transmitter.

Figure 2:
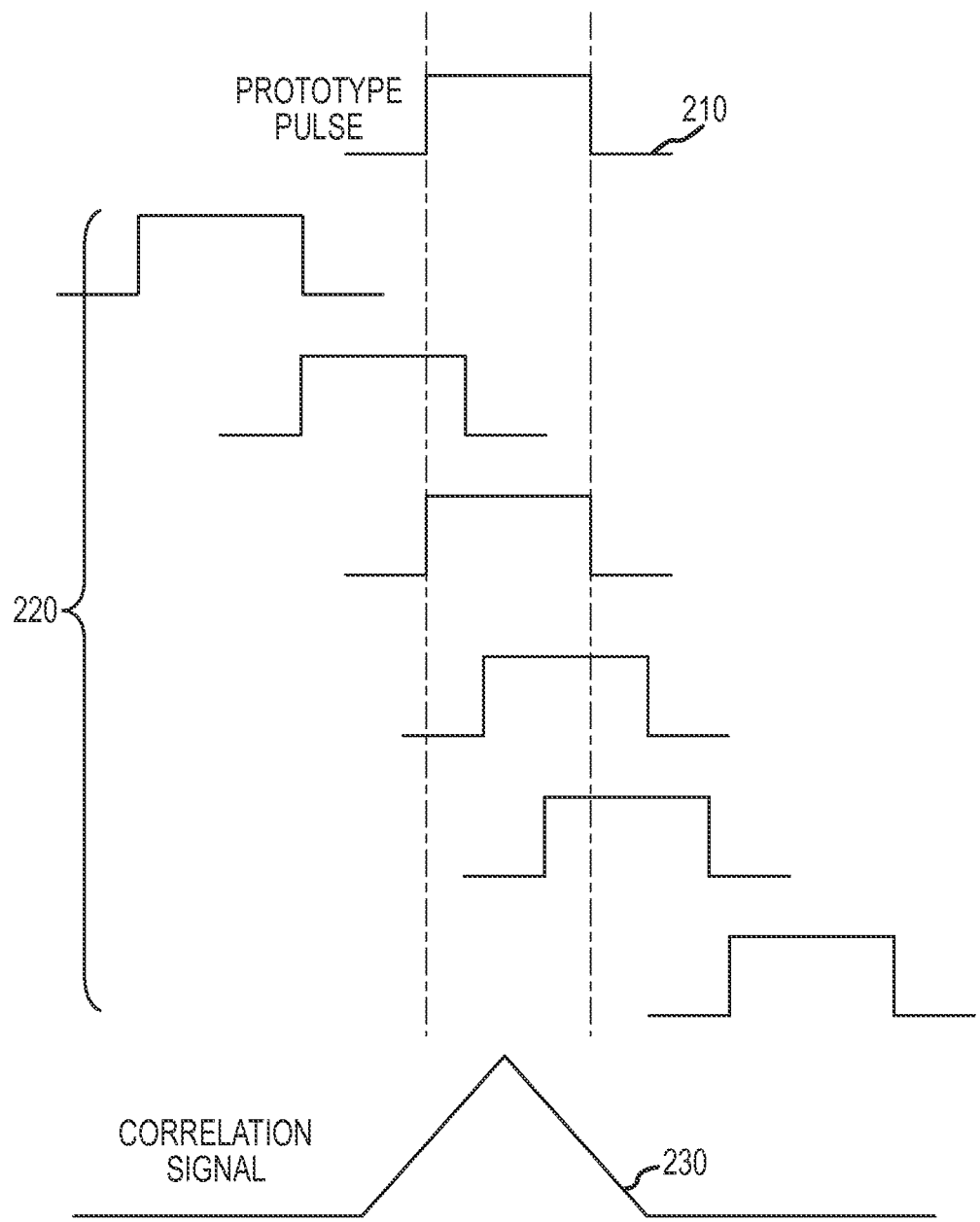
FIG. 2 is a depiction of pulse correlation as utilized in one embodiment of the present invention.

The time resolution (and therefore distance resolution) can be appreciably shorter than the width of the pulse. FIG. 2 shows an example of a received pulse being "correlated" with a reference pulse. At first, there is no overlap. As the leading edge of the received pulse 220 begins to overlap the prototype pulse 210, the area of overlap begins to climb. When the received pulse and the prototype pulse are completely lined up, the area of overlap peaks 230. Then as the end of the received pulse moves across the prototype pulse, the area of overlap drops. Accordingly, the reference signal between the received pulse and the prototype pulse approximates a triangle 230, whose width is twice the pulse width. As mentioned, a 30 Gbps pulse has a spatial width of approximately 1 centimeter, so the reference signal looks like a triangle whose base width is 2 centimeters. The peak of the triangle however can be resolved to much less than the triangle width. The accuracy to which the peak can be located depends on the reception of a clean (sharp and noise free) pulse. Higher frequency pulses are more susceptible to attenuation and distortion than low frequency pulses.

A single transmitted pulse can be severely attenuated and badly distorted as it propagates through a medium such as the human body. For this reason, and according to one embodiment of the present invention, a pulse sequence, typically based on a digital sequence with good reference properties, is transmitted. One example of such a sequence is a Barker sequence or Barker code.

A Barker code resembles a discrete version of a continuous chirp (described below), used in other pulse compression radars. The positive and negative amplitudes of the pulses forming the Barker codes imply the use of bi-phase modulation; bi-phase modulation is the change of phase in the carrier wave of 180 degrees. Pseudorandom number sequences can be thought of as cyclic Barker Codes, having perfect (and uniform) cyclic autocorrelation side lobes. Very long pseudorandom number sequences can also be constructed.

Barker codes are widely used in certain spread spectrum systems (such as 802.11b WiFi) and many pulse compression radar systems. According to one embodiment of the present invention, when a received sequence such as a Barker code is correlated against a reference sequence, a similar triangle correlation signal peaks only when the sequences line up, with the triangle again being twice the width of one pulse in the sequence. One advantage of using a sequence of this type is that the "processing gain" is the combination of the energy of many pulses instead of only a single pulse.

Figure 3:
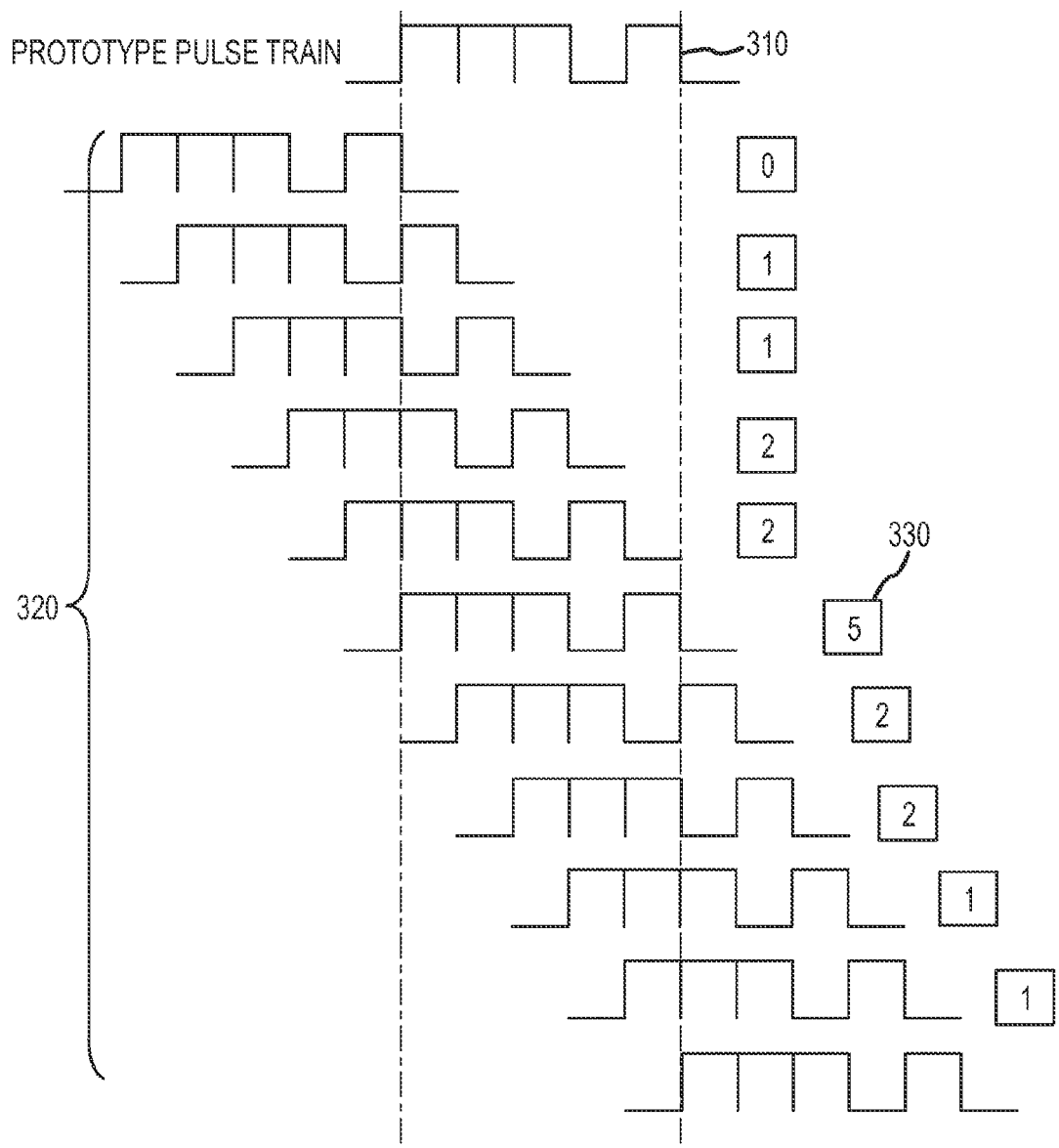
FIG. 3 is a depiction of a pulse train or pulse sequence correlation as utilized in one embodiment of the present invention.

FIG. 3 is an example of a pulse sequence correlation as utilized in one embodiment of the present invention. A sequence of pulses 320 is transmitted from the transmitter and received by the receiver. The received pulses 320 are compared to a prototype pulse 310. At the point that the two sequences are correlated the correlation value 330 is at a maximum, or the equivalent to the peak of the triangle in the prior example. The processing gain of such a sequence allows lower transmit power, a smaller receive antenna, and results in a cleaner, lower noise receive signal. Known Barker codes and the like only go up to a length of 13 resulting in a processing gain of just over 10 dB. Other systems use much longer sequences to achieve higher processing gain. For example, the GPS uses a 1023-bit pseudorandom sequence (the C/A code), yielding a processing gain of over 30 dB. This processing gain is why a GPS unit with a very small antenna can still pick up and decode the very weak satellite signals. However the GPS sequence has a frequency (bit rate) of just over 1 Mbps, which is a pulse spatial width of 300 meters. The fact that simple GPS receivers can resolve location to a few tens of feet demonstrates the power of such correlation processing. One embodiment of the present invention uses a digital pulse sequence having sufficient spatial width to allow for correlation processing so as to result in an accuracy of less than one millimeter.

According to another embodiment of the present invention, implementation of the transmitter can be done primarily with digital circuits. One version of the present invention uses serdes (multiplexer) circuits that run at about 30 Gbps. A tree of such multiplexers can be used to convert a parallel correlation sequence into a high speed serial bit stream. This bit stream can be applied to a standard transmitter of the appropriate power and bandwidth using a variety of sequences of different lengths.

Figure 4:
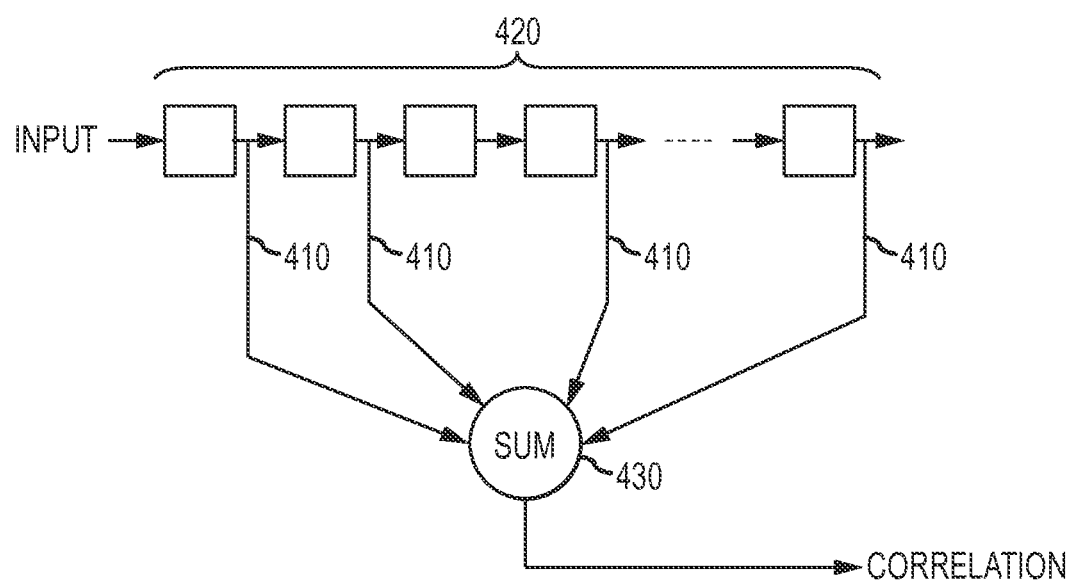
FIG. 4 is a high level schematic of a pulse train correlator according to one embodiment of the present invention.

The general form of a correlation circuit, according to one embodiment of the present invention, is shown in FIG. 4. The circuit is a tapped delay line, with delays equal to the bit width. Such a circuit would be implemented digitally, digitizing the receive signal with an analog-to-digital converter at sample rates of many tens to hundreds of giga-samples per second. With a pulse rate of 30 Gbps, each delay between taps in the tapped delay line is 33.3 picoseconds. For a long sequence, these delays must be very accurate, since any error will build up through the delay line. However, using a reference clock signal (which is available in this system since the receiver is coupled to the master station) adjustments to these delays can be done using well known circuit techniques. The taps 410 are simply connections at each location in the sequence that has a 1 bit and no connection 420 where there is a 0 bit. The summer 430 is a straightforward analog summer, and the peak detector is a standard analog circuit.

As an alternative to the correlation sequence described above, another embodiment of the present invention utilizes a "chirp" waveform. A chirp is a signal in which the frequency increases ("up-chirp") or decreases ("down-chirp") with time. In some sources, the term chirp is used interchangeably with sweep signal. It is commonly used in sonar and radar, but has other applications, such as in spread spectrum communications. In spread spectrum usage, surface acoustic wave "SAW" devices such as reflective array compression are often used to generate and demodulate the chirped signals. In optics, ultrashort laser pulses also exhibit chirp, which, in optical transmission systems interacts with the dispersion properties of the materials, increasing or decreasing total pulse dispersion as the signal propagates.

Most radar and sonar systems are designed to have resolutions of at least many meters. Accordingly, the embodiments of the present invention use frequencies that are considerably higher to result in the necessary resolution.

According to another embodiment of the present invention, the signal processing takes place using more conventional analog circuitry. As mentioned analog systems do not have the flexibility of a digital approach (e.g., choosing the length of the sequence to optimize parameters) but they still possess enough flexibility to achieve the goals of the system.

According to the analog embodiment of the present invention, the master control sends a sinusoidal signal to the transmitter and each receiver at a given phase. The receiver knows the transmitted phase because it is hardwired to the same clock source as the transmitter. Thus the phase difference between the transmitted phase and the received phase indicates the distance between the transmitter and the receiver. For example, the wavelength of a sinusoid at 300 MHz is about 1 meter. So, 360 degrees of phase is 1 meter long, or 1 degree is approximately 2.8 millimeters. Similarly, 1 degree of phase of 30 GHz is approximately 0.028 millimeters. In one version of the present invention multiple sinusoids are transmitted by the transmitter for location determination.

Consider, for example, that a circuit can accurately measure phase difference to a resolution of 36 degrees. For a sinusoid at 300 MHz, 36 degrees represents 10 centimeters. So, if the phase difference is, for example, 72 degrees, the distance is 20 centimeters, or 1.2 meters, or 2.2 meters, etc. In other words, the distance measurement is modulo the wavelength. So to locate the transmitter, several sinusoids of different frequencies must be transmitted to resolve which wavelength is associated with the correct distance. One way to do this is to use a set of frequencies that are related by factors of 2 (i.e. a binary set). So, for example, the transmitter might transmit 150 MHz (wavelength of 2 meters), 300 MHz (1 meter), 600 MHz (50 centimeters), 1.2 GHz (25 centimeters), 2.4 GHz (12.5 centimeters), 4.8 GHz (6.25 centimeters), and 9.6 GHz (3.125 centimeters). By measuring the phases of all these sinusoids to an accuracy of perhaps 10 degrees, the location of the transmitter can be resolved to about 0.87 millimeters. Adding a sinusoid at 19.2 GHz can resolve the location to 0.44 millimeters, etc. Measuring phase to better than 10 degrees will improve the resolution appropriately.

The selection of the sinusoids is narrowed by providing, within a certain margin of error, the location of the transmitter. Using that information some of the sinusoids can be eliminated and the system simplified. But the use of analog system is not without its challenges.

Because this analog system does not have the advantage of processing gain, the received signals can experience noise. For this reason and according to one embodiment of the present invention, the phase measurements are heavily filtered (averaged). To some extent the filtering accomplishes some of the same improvements as the digital processing gain. Conceptually, heavy filtering means that the measurements include many cycles of the sinusoids. The filtering will greatly reduce the effects of noise and allow the measurement of phase to a very small number of degrees. Adjusting the time constants of the filtering achieves similar results as does adjusting the length of the digital sequences.

Figure 5:
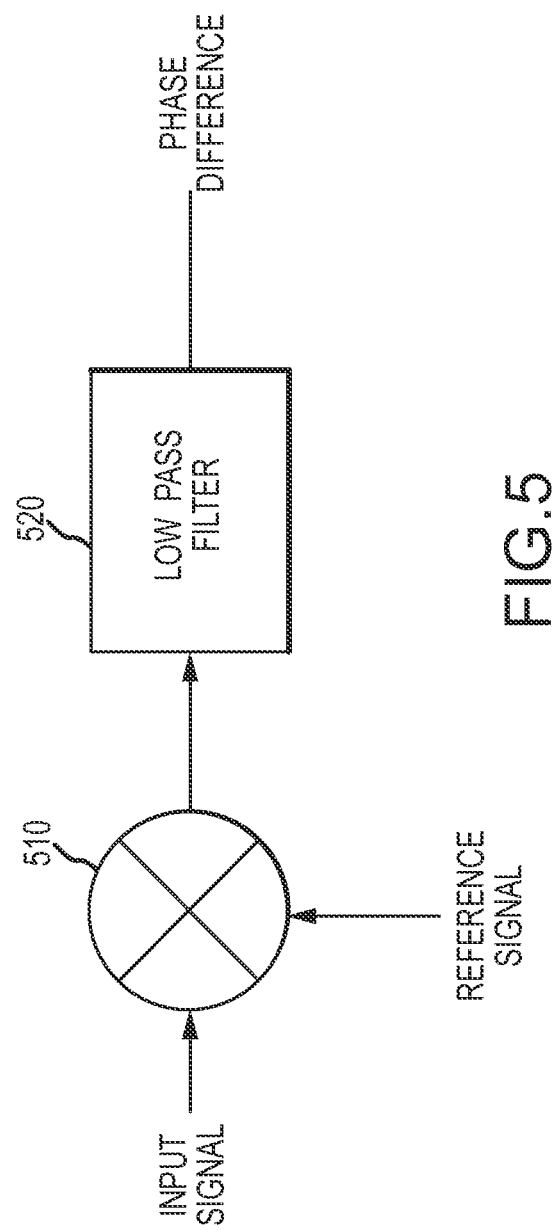
FIG. 5 is a high level schematic of a phase difference circuit as utilized in one embodiment of the present invention.

According to one embodiment of the present invention the transmitter comprises an appropriate number of sine wave generators (oscillators). In the receiver, each phase measurement circuit (one for each frequency) uses a phase detector 510, comprised of a multiplier (mixer) followed by a low pass filter 520 as shown in FIG. 5. These circuits are preceded by a small filter bank to separate the sinusoids of different frequencies.

In another embodiment of the present invention a modulated sequence of signals is transmitted that achieves a correlation again as well as a filtered resistance to noise. As is well known a sinusoidal signal has a phase of 360 degrees. Said differently, the signal repeats every 360 degrees. As previously discussed the distance can be determined, in an analog system, by measuring the differences in phase between the transmitted signal and the reference signal.

The digital system presented above is significantly more flexible albeit more complicated. For example, if the attenuation in the propagation channel is very large, the amplitude of the received signal will be too low to achieve the desired spatial resolution. For the analog system, the remedy to such a dilemma is to increase the transmit power, but there are likely limits on the allowable transmit power for a given application. For the digital system, the remedy is simply to increase the length of the pulse sequence but that too has limits.

A new signal which is analog but exhibits a pulse correlation much like a digital signal is comprised of pulses that are analog signals 180 degrees out of phase. The sequence of pulses, so to speak, are a series of analog signals in which one signal having a 0 degree phase is interpreted as a zero while the next signal having a 180 degree phase is a one. A sequence of out of phase analog signal can create the same correlation signal as a digital sequence. In addition, the phase delay identified in each signal can also be filtered and measured to provide another, independent measurement of the distance. As a result, accuracy can be achieved by combining the two techniques that would not otherwise be obtainable.

The "channel characteristics" of the electromagnetic propagation link between the transmitter and receiver also plays an important part in how accurately the system determines location. The transmitted signal will undergo attenuation, dispersion, frequency distortion, and possibly multipath. In the digital system, these effects will cause the received pulse shape to be distorted and therefore reduce the sharpness of the correlation triangle. Many of these effects can be mitigated by using a longer pulse sequence, which is a significant advantage of the digital system. In the analog system, these effects will cause the phase of the received signal to jitter. Jitter is the undesired deviation from true periodicity of an assumed periodic signal in electronics and telecommunications, often in relation to a reference clock source. Jitter may be observed in characteristics such as the frequency of successive pulses, the signal amplitude, or phase of periodic signals. But jitter can be reduced by judicious filtering.

Figure 6:
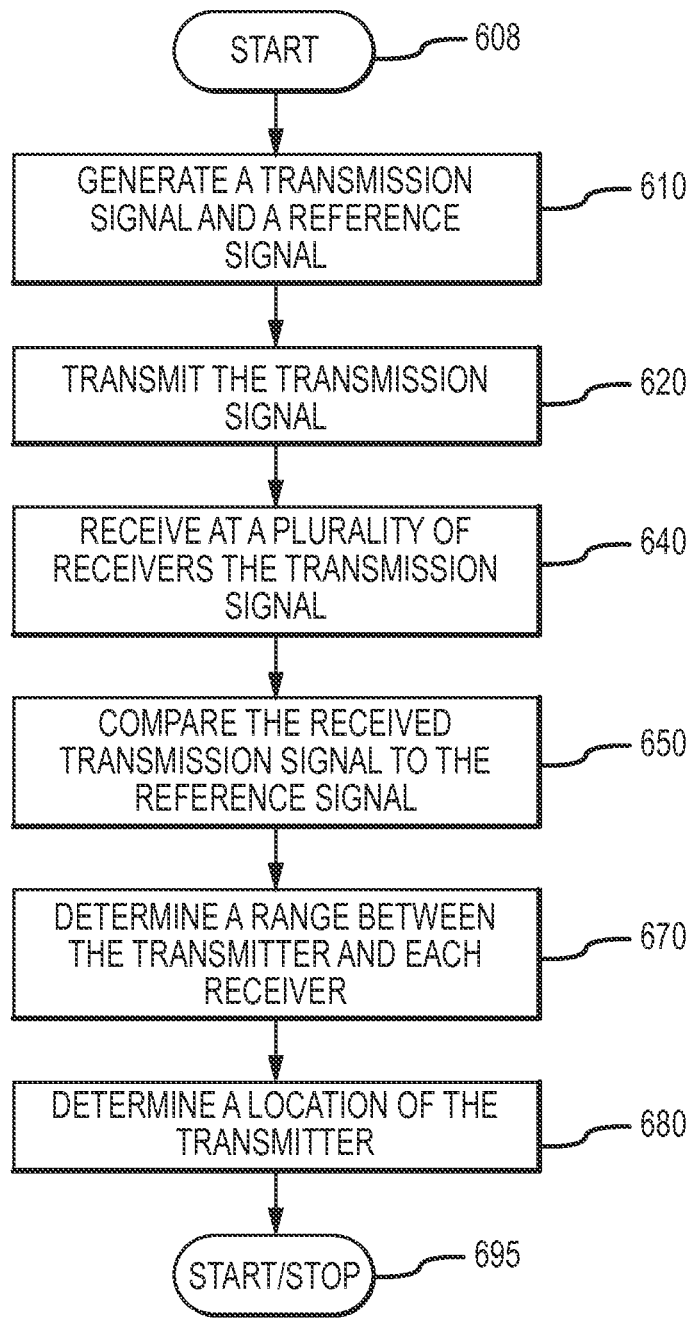
FIG. 6 is a flowchart for one method embodiment to determining the position of a transmitter using a range The Figures depict embodiments of the present invention for purposes of illustration only. One skilled in the art will readily recognize from the following discussion that alternative embodiments of the structures and methods illustrated herein may be employed without departing from the principles of the invention described herein.

FIG. 6 illustrates one method embodiment of the present invention for determining a range localization. As previously mentioned the process begin 605 with the generation of a transmission signal and a reference signal 610. While not required, in one preferred embodiment the generation of these two signals occurs at a master station or similar central processing unit. The signals, as has been discussed herein, can be of a digital or analog form or a combination thereof. By generating the two signals from the same source it can be reasonably expected that the signals are substantially the same. As one of reasonable skill in the art will appreciate, the differences between the reference signal and the received transmission signal are essential to the determination of an accurate range between the transmitter and receiver. Accordingly, any differences between the reference signal and received transmitted signal that are not related to propagation of the transmission signal through space increases error and decreases accuracy.

Once the transmission signal and reference signal have been generated, they, according to one embodiment of the present invention, are conveyed to the transmitter and receivers respectively. According to another aspect of the present invention the transmitter and receivers are physically (hard wired) coupled to the master station/signal generator. By doing so, a precise determination can be made with respect to any time delay, distortion or attenuation attributed to the physical properties of the medium that is used to transport the signal to its respective location. While the present invention anticipates these distances to be relatively short and the delay minimal, it can nonetheless decrease the accuracy of the final localization of the transmitter if not taken into account.

Once the transmission signal is delivered to the transmission antenna it can be transmitted 620 to a plurality of receivers. According to one embodiment of the present invention a calibration transmission can occur from a known location. As the location of the transmitting antenna is already known the derived location can be compared to its actual location for calibration purposes. For example, the location of each corner of a table can be known and used to establish a datum on which a unique location can be designated. Errors in location of the antenna as determined by the system can then be used to adjust later determinations of location with reference to same datum. These calibration modifications can enhance the systems reliability and accuracy. Furthermore, additional references of a known location on an object of interest can be identified to provide a volumetric reference.

Once the reference signal has been transmitted 620 it propagates through various mediums until being received 640 by a plurality of receivers. The location of each receiver with respect to each other, and in one embodiment, with respect to a datum, is known. Each receiver possesses a reference signal substantially identical to the transmission signal and compensated for the conveyance of the signal to the receiver from the signal generator.

With the reference signal and received transmission signal at hand, a comparison 650 takes place to determine a delay between the reference signal and the received transmission signal. The delay, being the time that it takes for the transmission signal to travel from the transmission antenna to the receiver, is indicative distance between the transmitter and the receiver(s).

With the comparison complete and the delay ascertained a range between each receiver and the transmitter is determined 670. Each range defines a locus of points at which the transmitter could exist. This locus of points is a sphere originating at each receiver. For a particular transmission by the transmitter and reception by the plurality of receivers, the intersection of the spheres defined by the corresponding range to the transmitter defines 680 the location of the transmitter ending 695 the process. This location is a point in space relative to the locations of the receivers. In another embodiment of the present invention the location of the transmitter can be relative to a datum such as a horizontal surface. From a specific point on that datum the location of the transmitter can be determined with Cartesian or Polar Coordinates.

In other embodiments of the present invention multiple transmitters transmit unique transmission signals simultaneously to the plurality of receivers. Each transmitter identifies a specific location at the same point of time. Using this information volumetric information can be defined. Moreover, assuming that three or more of the transmitters are located at relatively stable positions, but nonetheless a moving body, they can be used as a reference to show the movement of another transmitter as it traverses a particular region of interest.

While in this embodiment the reference signal is conveyed to the receiver ultimately to be compared against the received signal, in other embodiments the received signal could be conveyed to the master station where a similar comparison would take place. In each case the compensation for the medium through which the signals traverse is accomplished. One implementation of the present invention is to apply the technology described above in medical or small scale implementations such as interventional radiology. Current techniques for Fine Needle Aspiration (FNA) rely on visual guidance to place the tip of the needle at the point of treatment. Once the needle tip is placed, radiation is applied to treat the tissue. However the spatial location of the needle tip is inherently inaccurate. Even though the physician is confident that the needle is located at the point of treatment, the radiation beam is inaccurately aimed. Currently X-ray computed tomography (CT) scans are used to fine tune the location of the needle prior to treatment but CT scans also irradiate the patient and thus have limited applicability. The localization system of the present invention would improve accuracy, speed and require less radiation exposure for image guidance. By using an embodiment of the present invention to identify the precise position of the needle tip a CT scan's field of view (FOV) or other treatment means can be reduced to an appropriately sized area just beyond the needle tip and including the needle tip if the position of the needle. By doing so the treatment can be considerably more focused and effective.

According to another embodiment of the present invention, two transmitters are placed along the shaft of the needle to provide a vector orientation relative to the table on which the patient is lying. According to this embodiment, the patient table represents a datum, the needle tip is a positional device and the needle track equals the guidance path with the CT/MRI/Ultrasound/Fluoroscope providing data to verify/calibrate exact location. The interconnected receivers of the present invention with known locations around the table's top provide the processor of the master station with different arrival times of the transmitter's signal. In this embodiment, the signal has two main values. The first is a fixed identification value and the second is a clock pulse that very precisely counts down and then starts over. The CPU uses the precise differences in arrival at each receiver to calculate a solution. The tabletop and needle can then be manipulated to ensure the CT/MRI image is aimed exactly at the tip of the needle and slightly beyond. Instead of the table moving serially forward or backward by a fixed amount relative to its last position, it is guided by the localizer. The antenna is miniaturized at the desired location with a very thin wire connecting it to the transmitter circuitry which is at the needle hub, outside the body.

One of reasonable skill in the relevant art will recognize that the processing of the difference between the received signal and the reference signal can occur at multiple locations. In one embodiment the processing can occur at the receiver while in other embodiments the processing can occur at the master station. The location of the processing can be modified as necessary to optimize accuracy.

Other implementations of the present invention include an endoscope with a transmitter antenna guiding its forward progress in the body. Intravascular catheters in which the tip of the catheter could be guided in the exact same way as the tip of the endoscope represent another example. Other implementations can be a urinary catheter in which transmitters placed at port-holes along the catheter provide guidance to biopsies via a flexible needle directed through the porthole into prostate, bladder and other urinary structures rather than the transrectal approach that is the current standard.

Moreover by adding a small bone drill-bit to the FNA, it would be possible to gain access to the brain and guide the biopsy needle to its target with the present invention rather than the current method that involves affixing a stereotactic frame to the patient's skull.

According to another aspect of the present invention the transmitters could be implanted. After the target has been traversed by the needle tip and images verify the target and as the needle are withdrawn from the body, a transmitter antenna can be left behind (inside the targeted organ). The transmitter circuitry assembly which is larger could be placed in a subcutaneous position similar to a pacemaker or with a port to allow for a wired connection to the master station. In this scenario, the anatomic structure from various transmitters can be tracked in real time. Typical targets would include lung masses or the prostate gland. With multiple transmitters, the central position of the target could be calculated as well as any translations or deformations.

Solutions can also include volumetric information-Anatomic targets may not only be displaced but they are also compressed or expanded during normal physiologic processes. For example, as bowel gas or stool approaches the prostate and as urine accumulates in the bladder, the prostate gland is compressed and displaced. In the same way that three transmitters located on an airplane's nose, wing tip and tail would give information about pitch, yaw and roll; three transmitters in the prostate at the right base, left midgland and near the apex would provide real-time volumetric adaptive information that is superior to image guidance with almost none of the radiation exposure that would result from continuous cine type imaging like fluoroscope.

With truly real-time volumetric information, much less normal tissue exposure and/or damage would be possible. Current state of the art can only verify position of the target by imaging such as cone beam CT scan on the treatment table moments before delivering the beams. However, the target is generally moving during the delivery of the radiation (external beam radiation is not an instantaneous delivery) reducing effectiveness. The current solution is to "gate" the treatment and stop delivery if the organ motion is suspected to have moved the target out of the beams covered area. Starts and stops therefore further prolong treatment and the chance for further target changes.

While the present invention has been described generally using a transmitter and a plurality of receivers coupled to a single master control that generates both a transmission signal and a reference signal, other embodiments can include wireless applications. In such an embodiment a plurality of receivers can be placed on an object that is known to be within range of a transmitter. The transmitter can be provided with predetermined or stored signals to be transmitted at a particular time or determinable time and the receivers can be provided with reference signals matching the signals to be transmitted and a time reference for their transmission. A reference clock signal can synchronize the transmission so that upon reception of the signal the master control knows at what time the signal was sent so as to conduct the proper comparison. By doing so the position of ships and airplanes in specific regions such as at an airport or in a harbor can be determined. For example one embodiment of the present invention can be used to control ships in their lanes and as they are docking using transmitters on the ships and receivers prepositioned at the port. Transmitters placed on shipping containers, crane, forklifts, warehouse entrances and workers can automate and control dockside operations.

In a similar manner transmitters on cars and trucks with ID portion indicating type of vehicle, weight and wheelbase plus the counter signal can be used to triangulate from cellular towers receiving the signal and processed centrally. Traffic lights can then be timed to modulate heavy traffic and signals can be sent to dashboard devices such as currently available GPS with alternate route suggestions.

According to another embodiment of the present invention, the difference in signals received from two or more transmitters can be used to determine the orientation of an object. If the ID signal includes dimensions of the cubical object like a box [i.e. 0011 (ID), 0010 (height), 0015 (width), 0020 (depth)] and the transmitters are located at the front upper left corner and back lower right corner of the object; then with two transmitters, the object's exact orientation in addition to center-of-gravity position can be calculated.

Examples of such an application include transmitters at tips of a forklift and at the back of the vehicle so as to give not only the location of the forklift but the orientation of the tines as they approach a pallet. Likewise the origination of an aircraft as it approaches an airport can be determined from the transmissions of multiple transmitters located at known positions on the aircraft.

The present invention determines the location of a transmitter by accurately measuring the elapsed time from transmission to reception at a plurality of disparate receivers of a known location. Location of the transmitter is determined by a comparison of the received transmitted signal to reference signal. From that comparison a range from each receiver to the transmitter can be determined. By intersecting the spheres defined by each range an accurate location of the transmitter can be obtained.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for range localization through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

As will be understood by those of reasonable familiarity with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A range localization system, comprising:
a plurality of receivers wherein a location of each receiver is known;
one or more transmitters; and
a master station in communication with the plurality of receivers, wherein the master station generates a reference signal and a transmission signal and wherein a range from the one or more transmitters to each receiver, and thereby a transmitter location, can be determined from a comparison of the transmission signal received at each receiver from the transmitter and the reference signal.

2. The range localization system of claim 1, wherein the transmission signal and the reference signal include a digital pulse sequence.

3. The range localization system of claim 1, wherein the transmission signal is a modulated sequence of digital pulses.

4. The range localization system of claim 1, wherein the transmission signal and the reference signal include a plurality of sinusoidal signals.

5. The range localization system of claim 1, wherein the transmission signal and the reference signal are analog signals.

6. The range localization system of claim 1 wherein location of the one or more transmitters can be determined from an intersection of spheres originating at each receiver having a radius equal to the range between each transmitter and said receiver.

7. The range localization system of claim 1 wherein the range from each transmitter to each receiver can be determined by detecting phase differences between the transmission signal received at each receiver and the reference signal.

8. The range localization system of claim 1, wherein the transmission signal is stored at the transmitter and transmitted at a determinable time.

9. The range localization system of claim 1, wherein the master station is in communication with the transmitter.

10. The range localization system of claim 9, wherein the master station generates the transmission signal.

11. The range localization system of claim 10, wherein the one or more transmitters, the plurality of receivers and master station are hardwired coupled.

12. The range localization system of claim 1, further comprising a reference location of a known position wherein responsive to the one or more transmitters being placed at the reference location errors in the determined transmitter location can be identified.

13. The range localization system of claim 1, further comprising a reference datum wherein location of the one or more transmitters can identified relative to the reference datum.

14. The range localization system of claim 1, wherein there is one transmitter.

15. A method for determining the location of an object, the method comprising: transmitting at a transmitter a transmission signal;
receiving at a plurality of receivers a received transmission signal wherein each receiver is communicatively coupled to a master station;
comparing the received transmission signal received at each receiver to a reference signal thereby determining a range between the transmitter and each receiver; and
determining a location of the transmitter based on intersecting spheres, each sphere defined by the range between the transmitter and receiver.

16. The method of claim 15, further comprising generating at the master station the transmission signal and the reference signal.

17. The method of claim 15, wherein the transmission signal and the reference signal are generated at the same time.

18. The method of claim 15, wherein a distance from the master station to each receiver and to the transmitter is precisely known.

19. The method of claim 15, wherein the transmission signal and the reference signal are comprised of a sequence of digital pulses.

20. The method of claim 15, wherein the transmission signal and the reference signal comprise a plurality of sinusoidal signals.

21. The method of claim 15, further comprising calibrating the location of the transmitter using a predefined position.

22. The method of claim 15, wherein the reference signal and the transmission signal are digital signals.

23. The method of claim 15, wherein the reference signal and the transmission signal are analog signals.

24. The method of claim 15, wherein the reference signal and the transmission signal are substantially identical.

25. The method of claim 15, further comprising generating at the master station the transmission signal and the reference signal.

26. The method of claim 15, wherein the transmitter and the master station are communicatively coupled.

27. The method of claim 15, further comprising storing at the transmitter the transmission signal, wherein the transmission signal is transmitted at a determinable time.

* * * * *